United States Patent
Miyazoe et al.

(10) Patent No.: US 7,677,264 B2
(45) Date of Patent: Mar. 16, 2010

(54) MANIFOLD-TYPE SOLENOID VALVE WITH EXTERNAL PORT

(75) Inventors: Shinji Miyazoe, Tsukuba-gun (JP); Katsuyuki Senba, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 721 days.

(21) Appl. No.: 11/233,066

(22) Filed: Sep. 23, 2005

(65) Prior Publication Data
US 2006/0081297 A1    Apr. 20, 2006

(30) Foreign Application Priority Data
Oct. 15, 2004    (JP) .............................. 2004-301966

(51) Int. Cl.
*F15B 20/00*    (2006.01)
(52) U.S. Cl. ................... 137/269; 137/596.16; 137/884
(58) Field of Classification Search ............ 137/596.16, 137/625.63, 625.64, 269, 271, 883, 884 137/106; 251/26
See application file for complete search history.

(56) References Cited

U.S. PATENT DOCUMENTS

| | | | | |
|---|---|---|---|---|
| 3,323,547 | A * | 6/1967 | Husen, Jr. et al. ...... | 137/625.64 |
| 3,540,480 | A * | 11/1970 | Malinowski et al. ... | 137/625.64 |
| 4,257,572 | A * | 3/1981 | Neff ....................... | 137/625.64 |
| 4,524,803 | A * | 6/1985 | Stoll et al. .............. | 137/625.64 |
| 5,437,306 | A * | 8/1995 | Asou et al. ............. | 137/625.64 |
| 5,462,087 | A * | 10/1995 | Fukano et al. ............... | 137/884 |
| 5,586,570 | A * | 12/1996 | Fukano et al. ............... | 137/271 |
| 5,597,015 | A * | 1/1997 | Asou et al. ............. | 137/625.64 |
| 5,603,355 | A * | 2/1997 | Miyazoe et al. ........ | 137/625.64 |
| 5,615,710 | A * | 4/1997 | Sato ....................... | 137/625.64 |
| 5,623,967 | A * | 4/1997 | Hayashi .................. | 137/625.64 |
| 5,704,399 | A * | 1/1998 | Hayashi et al. ............. | 137/884 |
| 5,725,255 | A * | 3/1998 | Hayashi et al. ................ | 285/26 |
| 5,749,395 | A * | 5/1998 | Hayashi et al. ........ | 137/596.16 |
| 5,771,918 | A * | 6/1998 | Fukano et al. .............. | 137/269 |
| 5,868,157 | A * | 2/1999 | Yoshimura et al. .......... | 137/269 |
| 5,924,439 | A * | 7/1999 | Miyazoe et al. ............. | 137/269 |
| 5,944,056 | A * | 8/1999 | Miyazoe et al. ........ | 137/625.64 |
| 5,983,921 | A * | 11/1999 | Miyazoe et al. ............. | 137/269 |
| 6,026,856 | A * | 2/2000 | Miyazoe et al. ........ | 137/596.16 |
| 6,109,291 | A * | 8/2000 | Yoshimura .................. | 137/269 |
| 6,167,901 | B1 * | 1/2001 | Yoshinura ................... | 137/269 |

(Continued)

FOREIGN PATENT DOCUMENTS

JP    10-47509    2/1998

*Primary Examiner*—Stephen Hepperle
*Assistant Examiner*—Craig Price
(74) *Attorney, Agent, or Firm*—Oblon, Spivak, McClelland, Maier & Neustadt, L.L.P.

(57) ABSTRACT

A manifold-type solenoid valve comprises a main valve section and a solenoid operating section. The main valve section has a spool in a valve hole to which respective switching flow paths for supply, output, and discharge are opened. The main valve section comprises connecting flow paths for collective supply and/or collective discharge having connecting ports, output ports, and an external port for connecting an external piping for independent supply or independent discharge. The output ports are in communication with the switching flow path for output. The connecting flow paths for collective supply and/or collective discharge are in communication with the switching flow path for supply and the switching flow path for discharge. Additionally, the external port is in communication with the switching flow path for supply or the switching flow path for discharge.

37 Claims, 13 Drawing Sheets

U.S. PATENT DOCUMENTS

| | | | |
|---|---|---|---|
| 6,325,102 B1 * | 12/2001 | Misumi et al. | 137/625.64 |
| 6,612,332 B2 * | 9/2003 | Miyazoe et al. | 137/884 |
| 6,840,273 B2 * | 1/2005 | Miyazoe et al. | 137/625.64 |
| 7,252,115 B2 * | 8/2007 | Miyazoe et al. | 137/625.64 |
| 7,252,116 B2 * | 8/2007 | Miyazoe et al. | 137/625.64 |
| 7,316,244 B2 * | 1/2008 | Miyazoe et al. | 137/625.64 |
| 7,328,720 B2 * | 2/2008 | Miyazoe | 137/596.16 |
| 2005/0236052 A1 | 10/2005 | Miyazoe et al. | |
| 2005/0236054 A1 | 10/2005 | Miyazoe et al. | |
| 2005/0236595 A1 | 10/2005 | Miyazoe et al. | |
| 2006/0081802 A1 * | 4/2006 | Miyazoe | 251/129.15 |

* cited by examiner

MANIFOLD-TYPE SOLENOID VALVE WITH EXTERNAL PORT

TECHNICAL FIELD

The present invention relates to a manifold-type solenoid valve with an external port and, more specifically, to a manifold solenoid valve with an external port to be built in a solenoid valve assembly together with other plurality of solenoid valves having no external port for use.

PRIOR ART

A technology to connect a plurality of solenoid valves and use in a form of a solenoid valve assembly is publicly known in the related art as disclosed, for example, in Patent Document 1. The solenoid valve assembly of this type generally employs a collective piping system and is configured in such a manner that pressure fluid is supplied from a supply and exhaust block built in the assembly collectively to the respective solenoid valves via connecting flow paths which communicate the solenoid valves with respect to each other, or exhaust fluid is discharged from the respective solenoid valves collectively.

Patent Document: Japanese Patent Application Publication No. 10-47509

DISCLOSURE OF THE INVENTION

However, in the solenoid valve assembly in the related art as described above, only fluid of the same pressure can be supplied through the supply and discharge block to the respective solenoid valves. In order to supply fluid of different pressure to some of the solenoid valves, it is necessary to provide the plurality of supply and discharge blocks for each pressure and bring them into communication with these solenoid valves, and hence the length of the solenoid valve assembly increases correspondingly, and the apparatus is upsized. It is the same when exhaust fluid is separately discharged from some solenoid valves. Therefore, development of a solenoid valve of a structure which can solve such a problem is expected.

Accordingly, it is an object of the present invention is to provide a manifold-type solenoid valve, which has both functions of collective piping and independent piping, and hence enables such usages as supplying fluid at different pressure from fluid supplied through the collective piping or discharging exhaust fluid differently from the collective piping by being built in the solenoid valve assembly without using a plurality of supply and discharge blocks, whereby superior functionality is achieved.

In order to solve the problem, according to the present invention, a manifold-type solenoid valve with an external port, which is used by being built in a solenoid valve assembly composed of a plurality of solenoid valves. This solenoid valve includes a main valve section having a spool in a valve hole to which respective switching flow paths for supply, output, and discharge are opened, and a solenoid operating section for driving the spool with an electromagnetic force, the main valve section including connecting flow paths for collective supply and/or collective discharge having connecting ports opened on a side surface of a housing, output ports on the housing at a first end surface in the axial direction, and an external port for connecting an external piping for independent supply or independent discharge, wherein the output ports are in communication with the switching flow path for output, and the connecting flow paths and the external port are in communication with one of the switching flow paths for supply and for discharge respectively.

According to a detailed structure of the present invention, the housing includes one connecting flow path of both-way connecting type having the connecting ports opening on both left and right side surfaces of the housing, the connecting flow path is in communication with any one of the switching flow paths for supply or discharge, and the external port is directly in communication with the other switching flow path without intermediary of the connecting flow path.

In this case, it is also applicable that the housing further includes a direct flow path of both-way connecting type having the connecting ports opening on both left and right side surfaces of the housing, and the direct flow path may be blocked both from the switching flow path and from the external port.

According to another detailed structure of the present invention, the housing includes one each of the connecting flow path of both-way connecting type having the connecting ports opening on both left and right side surfaces of the housing, and the connecting flow path of one-way connecting type having an connecting port opening on one side surface, and the connecting flow paths are in communication with one of the switching flow paths for supply and for discharge, respectively, and the external port is in communication with the connecting flow path of one-way connecting type, and the connecting port of the connecting flow path of one-way connecting type can be blockaded by a lid member.

According to another detailed structure of the present invention, the housing includes two connecting flow paths of both-way connecting type having the connecting ports opening on both left and right side surfaces of the housing, and the connecting flow paths are in communication with one of the switching flow paths for supply and for discharge respectively, the external port is in communication with one of the connecting flow paths, and at least one of the connecting ports of the connecting flow path in communication with the external port, which are opened on both side surfaces of the housing, can be blockaded by the lid member.

In the present invention, preferably, the housing of the main valve section is composed of a plurality of blocks, and a bottom block as one of these blocks is provided with the connecting flow path, and the external port is in communication with the switching flow path via the bottom block, so that the function of the external port can be changed to supplying function or discharging function by replacing the bottom block by the one having the connecting flow path which provides different connection between the external port and the switching flow path.

In the present invention, the bottom block includes a bottom block for independent supply or a bottom block for independent discharge which are exchangeable with respect to each other. The bottom block for independent supply includes a connecting flow path for discharge being in communication with the switching flow path for discharge but blocked from the external port, and is adapted to bring the external port to be in direct communication with the switching flow path for supply or in communication therewith via the connecting flow path for supply. The bottom block for independent discharge includes a connecting flow path for supply being in communication with the switching flow path for supply but blocked from the external port, and is adapted to bring the external port in direct communication with the switching flow path for discharge or in communication therewith via the connecting flow path for discharge.

Furthermore, in the present invention, it is also possible that the output port and the external port are formed on the port block which is the other one of the blocks constituting the housing, or alternatively, that the output port is formed on the port block which is the other one of the blocks constituting the housing, and the external port is formed on the bottom block.

Since the manifold-type solenoid valve of the present invention has both functions of collecting piping and independent piping by providing the external port, and hence enables such usage as supplying fluid at different pressure from fluid supplied from the external port through the collective piping or discharging exhaust fluid differently from the collective piping by being built in the solenoid valve assembly without using the plurality of supply and discharge blocks, thereby being superior in functionality.

BRIEF DESCRIPTION OF THE INVENTION

DETAILED DESCRIPTION

Figure 11:
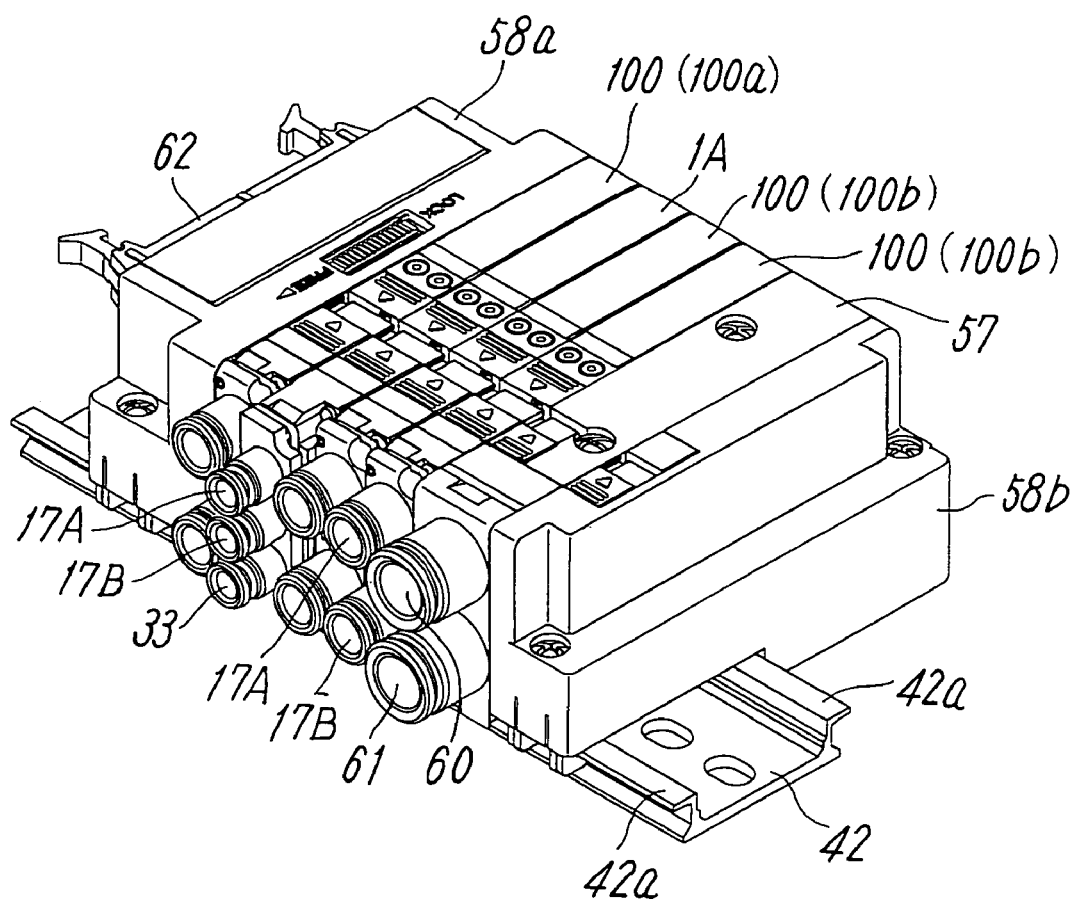
FIG. 11 is a perspective view of a solenoid valve assembly in which the solenoid valve according to the present invention is built.

FIG. 1 to FIG. 4 illustrate a first embodiment of a manifold-type solenoid valve with an external port according to the present invention. This solenoid valve 1A includes an external port 33 for supplying air independently, and is used by being built in a solenoid valve assembly together with a manifold-type solenoid valve 100 of a standard type having no external port as shown in FIG. 11.

In the description given below, the term "manifold-type solenoid valve with an external port" is referred simply as "solenoid valve with an external port" or "solenoid valve", and the term "manifold-type solenoid valve of a standard type" having no external port is referred to as "standard solenoid valve".

The standard solenoid valve 100 is different only in a point that the external port 33 is not provided and a structure relating thereto in comparison with the solenoid valve 1A with an external port, and other structures are substantially the same. Therefore, in the following description, the portion of the structure of the standard solenoid valve 100 common to the solenoid valve 1A with an external port are represented by the same appellation and reference signs as the solenoid valve 1A instead of redundant description and structures of the different portions are described as needed, and description of its general structure is omitted.

The solenoid valve 1A with an external port is a double-pilot type solenoid valve, and a main valve section 3 adapted to switch the fluid flow path by a spool 6, and a pilot type solenoid operating section 4 connected to the main valve section 3 at one end in the axial direction (longitudinal direction), and pilot air is controlled by two pilot valves 7a, 7b of the solenoid operation section 4 to drive the spool 6. Both side surfaces of the solenoid valve 1A in the direction of the width of the valve (direction of lateral width) are substantially flat a first contact surface 1a and a second contact surface 1b for connecting other solenoid valves.

Although pressure fluid which can be controlled by the solenoid valve 1A is liquid or air, the following description is made in the case of air.

The main valve section 3 includes a valve structure of five-port type, and includes a valve hole 10 extending in the axial direction of a housing 20, five switching flow paths 11, 12A, 12B, 13A, 13B for supply, output, and discharge, which are opened at different positions of the valve hole 10, the spool 6 slidably inserted into the valve hole 10 for switching the communication state among these switching flow paths, and first and second two pistons 14a, 14b coming into abutment with the spool 6 at both ends in the axial direction for driving the spool 6 by being pressed by pilot air supplied from the solenoid operating section 4. The main valve section 3 includes two connecting flow paths 15, 16 penetrating therethrough in the direction of the width of the valve, first and second two output ports 17A, 17B provided on the housing 20 on a first end surface opposite from the side where the solenoid operating section 4 is connected, and a manual operating element 18 including two manual buttons 18a, 18b which can switch the spool 6.

The connecting flow path 15, which is one of the two connecting flow paths 15 and 16, is for collective supply of main air, and the other connecting flow path 16 is for collective discharge of main air. The connecting flow path 15 for supply is connected to the switching flow path 11 for supply via a branch hole 15a, and the connecting flow path 16 for discharge is commonly connected to the two switching flow paths 13A and 13B for discharge via branch holes 16a, 16b which are in communication with each other. The two output ports 17A and 17B are independently connected to the switching flow paths 12A and 12B for output via communication holes 19a and 19b.

The housing 20 of the main valve section 3 is divided into a plurality of blocks having substantially the same width. In other words, it includes a center block 21 positioned at a center of the housing 20, a top block 22 connected to an upper end of the center block 21, a bottom block 23 connected to a lower end thereof, a port block 24 connected to the center block 21 at an end in the axial direction (longitudinal direction), and a manual block 25 connected to an end on the other side. Among others, the manual block 25 has a height equal to the height of the center block 21 and the top block 22 in the connected state. The bottom block 23 has an axial length corresponding to length of the center block 21 and the manual block 25 in the connected state, and are positioned by engaging an engaging wall 21a extending downward from one end of the center block 21. In addition, the port block 24 has a height corresponding to the height of the center block 21, the top block 22, and the bottom block 23 in the connected state. These blocks being square in cross section are assembled so as not to form misalignment in both of the contact surfaces 1a, 1b, and connected by screws 28 so as to be separable, whereby the housing 20 is formed to generally have a substantially square shape.

Although the respective blocks 21, 22, 23, 24, 25 can be formed of metal material such as aluminum or material such as synthetic resin, it is particularly preferable to form the center block 21 and the port block 24 and the manual block 25 of aluminum and the top block 22 and the bottom block 23 of synthetic resin.

The center block 21 is formed with the valve hole 10 extending in the axial direction of the solenoid valve 1A, and is also formed with the switching flow paths 11, 12A, 12B, 13A and 13B. Out of these switching flow paths, the switching flow path 11 for supply and the two switching flow paths 13A, 13B for discharge are opened to the joint surface with respect to the bottom block 23 at the lower end of the center block 21, and the two switching flow paths 12A, 12B for output are in communication with the output ports 17A, 17B provided in line on top and bottom on one end surface of the port block 24 via the communication holes 19a, 19b formed so as to extend across the center block 21 and the port block 24.

The bottom block 23 is formed with the connecting flow paths 15, 16, and the connecting flow paths 15, 16 are both-way connectable flow paths having connecting ports on both side surfaces of the bottom block 23, that is, on the first contact surface 1a and the second contact surface 1b. The both ends of the connecting flow paths 15, 16 are formed with connecting tube portions 26 of laterally elongated oval shape projecting toward the first contact surface 1a, and tube receiving portions 27 formed by enlarging the ends of the flow paths on the side of the second contact surface 1b corresponding to the shape of the connecting tube portions 26, and the connecting tube portions 26 and the tube receiving portions 27 constitute first connecting ports and second connecting ports, respectively. O-rings are attached to the insides of the tube receiving portions 27. As shown in FIG. 11, when the standard solenoid valves 100 are connected to both sides of the solenoid valve 1A, the connecting tube portions 26 and the tube receiving portions 27 are fitted to the tube receiving portions and the connecting tube portions of the same shape formed on the adjacent standard solenoid valves 100 via the O-rings, and corresponding connecting flow paths 15, 16 are hermetically connected to each other.

Since the connecting tube portions 26 and the tube receiving portions 27 at the both ends of the connecting flow paths 15, 16 constitute the first connecting ports and the second connecting ports, respectively, these connecting ports may also be represented by numerals "26" and "27" in the description below.

The bottom block 23 is also formed with a pilot supply through hole 30 penetrating in the direction of the width of the valve, and the pilot supply through hole 30 communicates with the two pilot valves 7a, 7b of the solenoid operating section 4 and the manual operating element 18 via the pilot branch hole, not shown. The pilot supply through hole 30 is also provided with the connecting tube portion and the tube receiving portion which fit hermetically with the pilot supply through holes of the adjacent standard solenoid valves 100 and the O-ring as in the case of the above-describe connecting flow paths 15, 16.

Therefore, the bottom block 23 has the same function as a manifold base of divided type in the related art, and hence may be considered that the function of the manifold base is integrally built in the solenoid valve 1A.

The port block 24 and the manual block 25 are formed with piston chambers, respectively, and the pistons 14a, 14b are accommodated in the respective piston chambers. Provided on the back surfaces of the pistons 14a, 14b are pilot pressure chambers 31a, 31b, respectively, and the pilot pressure chambers 31a, 31b are connected to one of the pilot valves 7a, 7b and the pilot supply through hole 30, respectively via the corresponding one of the manual buttons 18a, 18b by the independent pilot output path, not generally shown in the drawing. Although the two pistons 14a, 14b have the same diameters in the example shown in the drawing, these diameters may be different from each other.

When the first pilot valve 7a on one side is operated and hence pilot air is supplied to the first pilot pressure chamber 31a, the spool 6 is moved to the first switched position by the operation of the first piston 14a, and the switching flow path 11 for supply and the second switching flow path 12B for output come into communication with each other, so that the air output is taken from the second output port 17B, and at the same time, the first switching flow path 12A for output and the first switching flow path 13A for discharge come into communication with each other, so that the first output port 17A is brought into a discharging state. In contrast, when the second pilot valve 7b on the other side is operated and plot air is supplied to the second pilot pressure chamber 31b, the spool 6 is moved by the action of the second piston 14b to the second switched position which is on the opposite side of the position shown in FIG. 1 and the switching flow path 11 for supply and the first switching flow path 12A for output come into communication with each other, so that the air output is taken from the first output port 17A, and at the same time, the second switching flow path 12B for output and the second switching flow path 13B for discharge come into communication with each other, so that the second output port 17B is brought into a discharging state.

The port block 24 is provided with an external port 33 for connecting an external piping in addition to the output ports 17A, 17B. The external port 33 is disposed at a position downwardly of the second output port 17B, and is in communication with the connecting flow path 15 for supply via communication holes 34a and 34b extending across the port block 24 and the bottom block 23, and extends further from the connecting flow path 15 via the branch hole 15a into communication with the switching flow path 11 for supply. Therefore, the external port 33 in this embodiment is an external port for independent supply, and by connecting the external piping for air supply, the air can be supplied to the solenoid valve 1A independently. Since the bottom block 23 provides an independently supplying function to the external port 33 by bringing the external port 33 and the switching flow path 11 for supply into communication with each other, it is a bottom block for independent supply.

The connecting flow path 15 for supply with which the external port 33 communicates can clog one or both of the first connecting port 26 opening toward the first contact surface 1a of the housing 20 and the second connecting port 27 opening toward the second contact surface 1b by (a) proper lid member(s) 35. The lid member(s) 35 can be mounted by a proper method such as forming the same of a material having a sealing property such as rubber or synthetic resin into a plug shape, cap shape, or plate shape and inserting the same into the connecting port(s) 26 and/or 27, or covering the outside(s) thereof, or alternatively, covering the same by bringing them into abutment with the connecting port(s). In this case, the lid member(s) 35 may be fixed to the solenoid valve 1A independently, or may be fixed by sandwiching the same with the adjacent standard solenoid valve(s) 100.

In any case, the lid member 35 is preferably configured so as not to be hindrance when the connecting tube portion 26 and the tube receiving potion 27 are fitted to each other to connect the solenoid valve with an external port 1A and the standard solenoid valve 100, and it is also preferable to configure in such a manner that when the both solenoid valves 1A and 100 are connected in a state in which the connecting port(s) 26 and/or 27 of the solenoid valve 1A is (are) blockaded, the connecting port of the connecting flow path of the standard solenoid valve 100 is blockaded simultaneously.

A joint tube portion 24c is formed on the port block 24 at a joint portion with respect to the bottom block 23, and the joint tube portion 24c is adapted to be hermetically fitted to the end of the communication hole 34a of the bottom block 23 via a sealing member.

The output ports 17A, 17B and the external port 33 are provided with quick connecting pipe joints 36 which enable piping tubes to be connected in an anti-detachment manner only by being inserted thereto. Since the structure of the pipe joint 36 is already known, and is not related directly to the scope of the present invention, detailed description is omitted.

The manual operating element 18 is used for reproducing the switched state achieved by the pilot valves 7a, 7b by a manual operation, and includes the two manual buttons 18a, 18b arranged on the upper surface of the manual block 25 arranged in the direction of the width of the valve. The first manual button 18a corresponds to the first pilot valve 7a and the second manual button 18b corresponds to the second pilot valve 7b. When the first manual button 18a is pressed downward, the pilot supply through hole 30 is brought into direct communication with the first pilot pressure chamber 31a, without the intermediary of the first pilot valve 7a, and when the other second manual button 18b is pressed downward, the pilot supply through hole 30 is brought into direct communication with the second pilot pressure chamber 31b without the intermediary of the second pilot valve 7b.

The top block 22 is provided with a hook 40a projecting from the first contact surface 1a side of the solenoid valve 1A for being fitted to and engaged with the engaging hole of the adjacent standard solenoid valve 100, and is provided with an engaging hole (not shown) for engaging the same hook formed on the adjacent standard solenoid valve 100. The hook 40a is provided on a joint member 40 slidably mounted to the top block 22, and is adapted to be able to remove from and engage with the engaging hole by sliding the joint member 40.

Reference numeral 41 is a safety member provided at a position adjacent to the joint member 40, and locks the manual buttons 18a, 18b in an inoperable state when the solenoid valves are not connected to each other by the joint member 40.

A recessed rail mounting portion 43 to which a rail 42 (see FIG. 11) can be fitted is formed on the lower surface of the main valve section 3, so that the solenoid valve 1A can be mounted on the rail 42 by engaging flange portions 42a, 42a at both ends of the rail 42 with a rail clip 44 and a recess groove 45 of the rail mounting portion 43. The standard solenoid valve 100 is also configured in the same manner. The rail 42 is a DIN rail.

The solenoid operating section 4 includes the housing 20 of the main valve section 3, that is, an adapter block 50 connected to the manual block 25 and the bottom block 23 with screws. The adapter block 50 includes an intermediate base 50a extending horizontally from the mid position thereof, and the first pilot valve 7a and the second pilot valve 7b are mounted to both the upper and lower surfaces of the intermediate base 50a.

The pilot valves 7a, 7b include an exciting coil 51, a movable iron core 52 which is displaced by a magnetic force generated when energizing the exciting coil 51, and a valve member 53 driven by the movable iron core 52 for opening and closing a pilot valve seat. Then, when the first pilot valve 7a is energized, pilot air from the pilot supply through hole 30 is supplied to the first pilot pressure chamber 31a and hence the first piston 14a is driven, and when the second pilot valve 7b is energized, pilot air from the pilot supply through hole 30 is supplied to the second pilot pressure chamber 31b and hence the second piston 14b is driven.

Since the structure of the pilot valves 7a, 7b by itself is already known, and is not related to the scope of the present invention, further detailed description about the structure thereof will be omitted.

A relay connector 54 for a collective wiring of concentrated terminal shape is mounted to a lower end of the solenoid operating section 4. The relay connector 54 is electrically connected to the relay connector of the adjacent solenoid valve with respect to each other in a plug-in manner when the plurality of solenoid valves 1A, 100 are connected into the solenoid valve assembly, and are used both for power supply and signal transmission.

FIG. 11 shows an example of the solenoid valve assembly formed by mounting the solenoid valve 1 with one external port, the plurality of standard solenoid valves 100, one supply and discharge block 57, and two end blocks 58a, 58b on the rail 42. In this example, one standard solenoid valve 100 (hereinafter, designated as "100a" as needed) is connected to the first contact surface 1a side of the solenoid valve 1A with an external port, and two standard solenoid valves 100, 100 (hereinafter, designated as "100b" as needed) are connected on the opposite second connecting surface 1b side. The supply and discharge block 57 includes a supply port 60 for supplying air collectively and an exhaust port 61 for discharging collectively on an end surface thereof. In addition, one 58a of the end blocks serves also as a power feed block, and includes a base connector 62 for collective wiring, so that power can be supplied from the base connector 62 to the relay connector 54 of the respective solenoid valves 1A and 100 collectively.

The standard solenoid valve 100 can be obtained by replacing the bottom block 23 mounted to the solenoid valve 1A with an external port by another bottom block having two connecting flow paths for supply and discharge, or replacing the port block 24 by another port block provided with two output ports. Other components are the same as the solenoid valve 1A with an external port. In this manner, the solenoid valve 1A with an external port can be converted into the standard solenoid valve by replacing the bottom block and the port block by different ones also in solenoid valves in other embodiment or the modifications thereof, described below.

Figure 12:
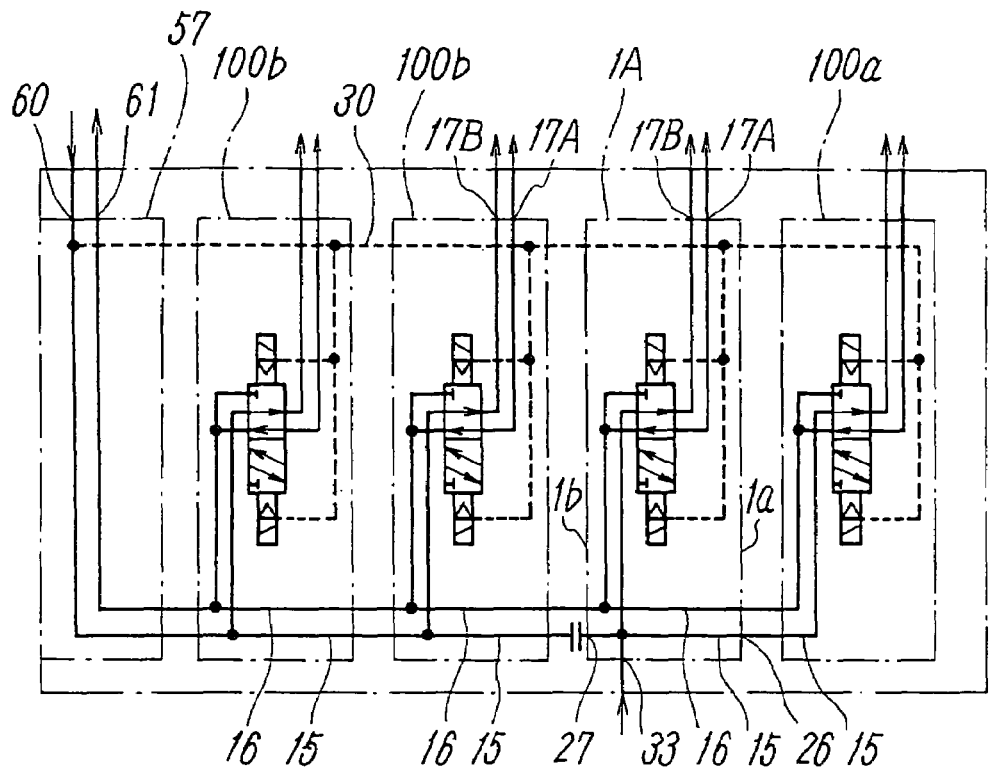
FIG. 12 is a flow path diagram showing an example of the connecting state of a flow path which can be realized by the solenoid valve assembly.
Figure 13:
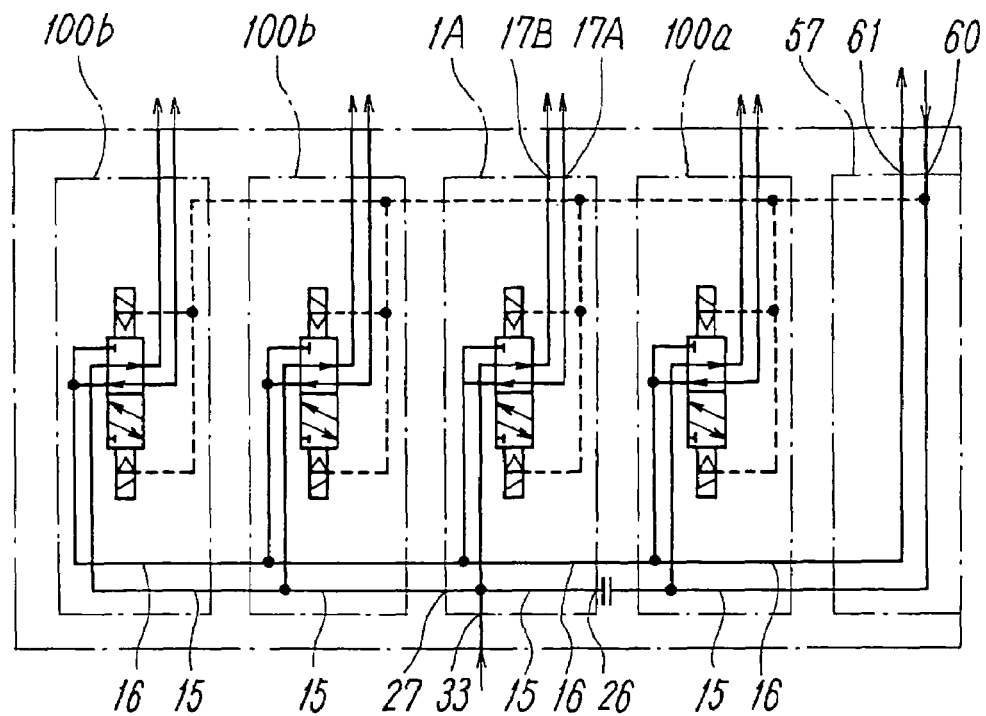
FIG. 13 is a flow path diagram showing another example of the connecting state of the flow path which can be realized by the solenoid valve assembly.
Figure 14:
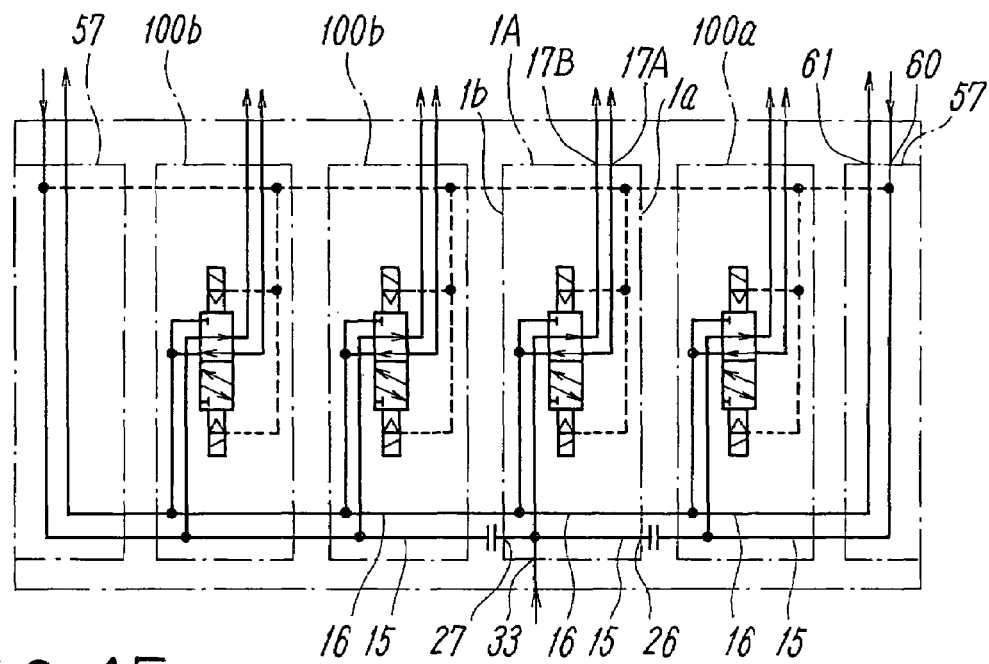
FIG. 14 is a flow path diagram showing another example of the connecting state of the flow path which can be realized by the solenoid valve assembly.

In FIG. 12 to FIG. 14, an example of the flow path diagram which can be realized the solenoid valve assembly is shown by reference signs. In these flow path diagrams, the external port 33 of the solenoid valve 1A with an external port is shown at the position opposite from the output ports 17A, 17B as a matter of convenience.

The flow path diagram in FIG. 12 shows a case in which the first connecting port 26 of the connecting flow path 15 for supply is opened, and the second connecting port 27 is closed in the solenoid valve 1A. In this case, the connecting flow path 15 is in communication with the connecting flow path 15 of the standard solenoid valve 100a located on the side of the first contact surface 1a with respect each other, and is blocked from the connecting flow paths 15 of the standard solenoid valves 100b, 100b located on the side of the second contact surface 1b. The connecting flow paths 15 of the standard solenoid valves 100b, 100b are in communication with each other and are in communication with the supply port 60 of the supply and discharge block 57. Therefore, air is supplied from the supply and discharge block 57 to the standard solenoid valves 100b, 100b, and air from a different pressure source is supplied to the solenoid valve 1A and the standard solenoid valve 100a on the side of the first contact surface 1a through the external port 33 of the solenoid valve 1A.

On the other hand, all the connecting flow paths 16 for discharge in the solenoid valve 1A with an external port and the respective standard solenoid valves 100 are in a state of collective discharge by being connected in sequence and being in communication with the discharge port 61 of the supply and discharge block 57.

The flow path diagram in FIG. 13 shows a state in which the first connecting port 26 of the connecting flow path 15 for supply is closed, and the second connecting port 27 is opened in the solenoid valve 1A with an external port, in which the supply and discharge block 57 is built in the position opposite from the case shown in FIG. 12. At this time, the connecting flow path 15 of the solenoid valve 1A is blocked from the connecting flow paths 15 of the standard solenoid valve 100a on the side of the first contact surface 1a, and is in communication with the connecting flow paths 15 of the standard solenoid valves 100b, 100b on the side of the second contact surface 1b. The connecting flow path 15 of the standard solenoid valve 100a is in communication with the supply port 60 of the supply and discharge block 57. Therefore, air is supplied from the supply and discharge block 57 to the standard solenoid valve 100a, and air from the different pressure source is supplied to the solenoid valve 1A with an external port and the standard solenoid valves 100b, 100b through the external port 33 of the solenoid valve 1A.

The point that all the connecting flow paths 16 for discharge in the solenoid valve 1A and the respective standard solenoid valves 100 are connected in sequence and are in communication with the discharge port 61 of the supply and discharge block 57 is the same as the case in FIG. 12.

The flow path diagram in FIG. 14 shows a case in which both of the two connecting ports 26, 27 of the connecting flow path 15 for supply in the solenoid valve 1A with an external port are closed. The two supply and discharge blocks 57 are also built in both sides of the row of the solenoid valves. At this time, the connecting flow path 15 of the solenoid valve 1A is blocked from the connecting flow path 15 of the standard solenoid valve 100a on the side of the first contact surface 1a and from the connecting flow paths 15 of the two standard solenoid valves 100b, 100b on the side of the second contact surface 1b, and hence air from the external port 33 is supplied only to the solenoid valve 1A with an external port. To the standard solenoid valve 100a, air is supplied from the supply port 60 of the one of the supply and discharge blocks 57 which is adjacent thereto, and to the other standard solenoid valves 100b, 100b, air is supplied from the supply port 60 of the other supply and discharge block 57.

All the connecting flow paths 16 for discharge in the solenoid valve 1A and the respective standard solenoid valves 100 are connected in sequence, and are in communication with the discharge ports 61 of the both supply and discharge blocks 57.

Figure 5:
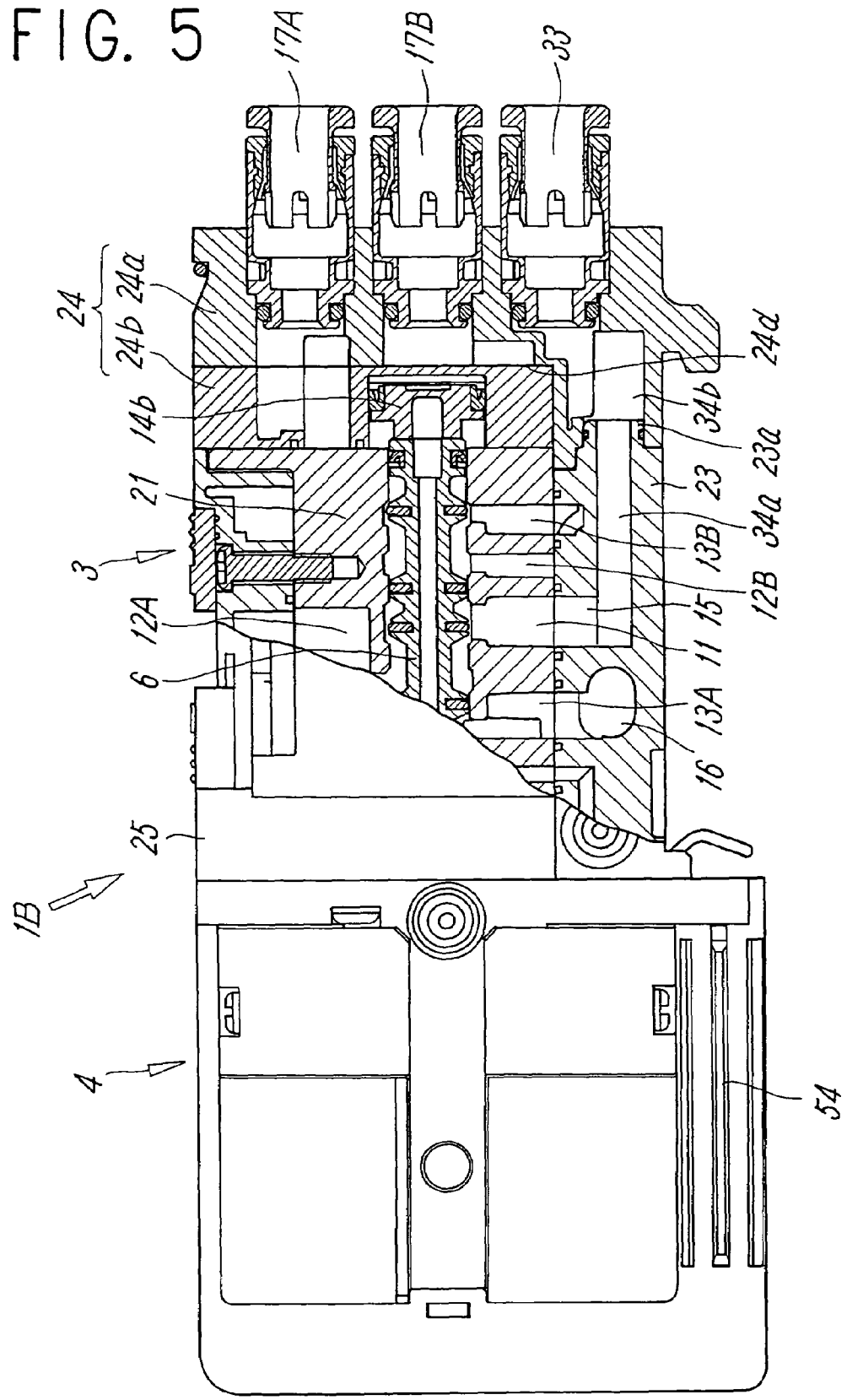
FIG. 5 is a cross-sectional view showing the solenoid valve according to a second embodiment of the present invention.

FIG. 5 shows a second embodiment of the manifold-type solenoid valve with an external port according to the present invention. In a solenoid valve 1B according to the second embodiment, the port block 24 is divided into a first block member 24a and a second block member 24b, and the two output ports 17A, 17B and the external port 33 are provided on the first block member 24a, and the piston chamber is formed in the second block member 24b, in which the piston 14b is accommodated. The second block member 24b has the same height as the center block 21 and the top block 22 in the connected state, and is build in a shoulder portion 24d formed in the first block member 24a. A joint tube portion 23a is formed at the joint portion between the first block member 24a and the bottom block 23 on the side of the bottom block 23, so that the joint tube portion 23a is hermetically fitted to the end of the communication hole 34b of the first block member 24a via a sealing member.

Since structures of the solenoid valve 1B according to the second embodiment other than those shown above, and the operation are substantially the same as the solenoid valve 1A according to the first embodiment, the principal identical components are represented by the same reference numerals as in the first embodiment, and description thereof is omitted.

Figure 6:
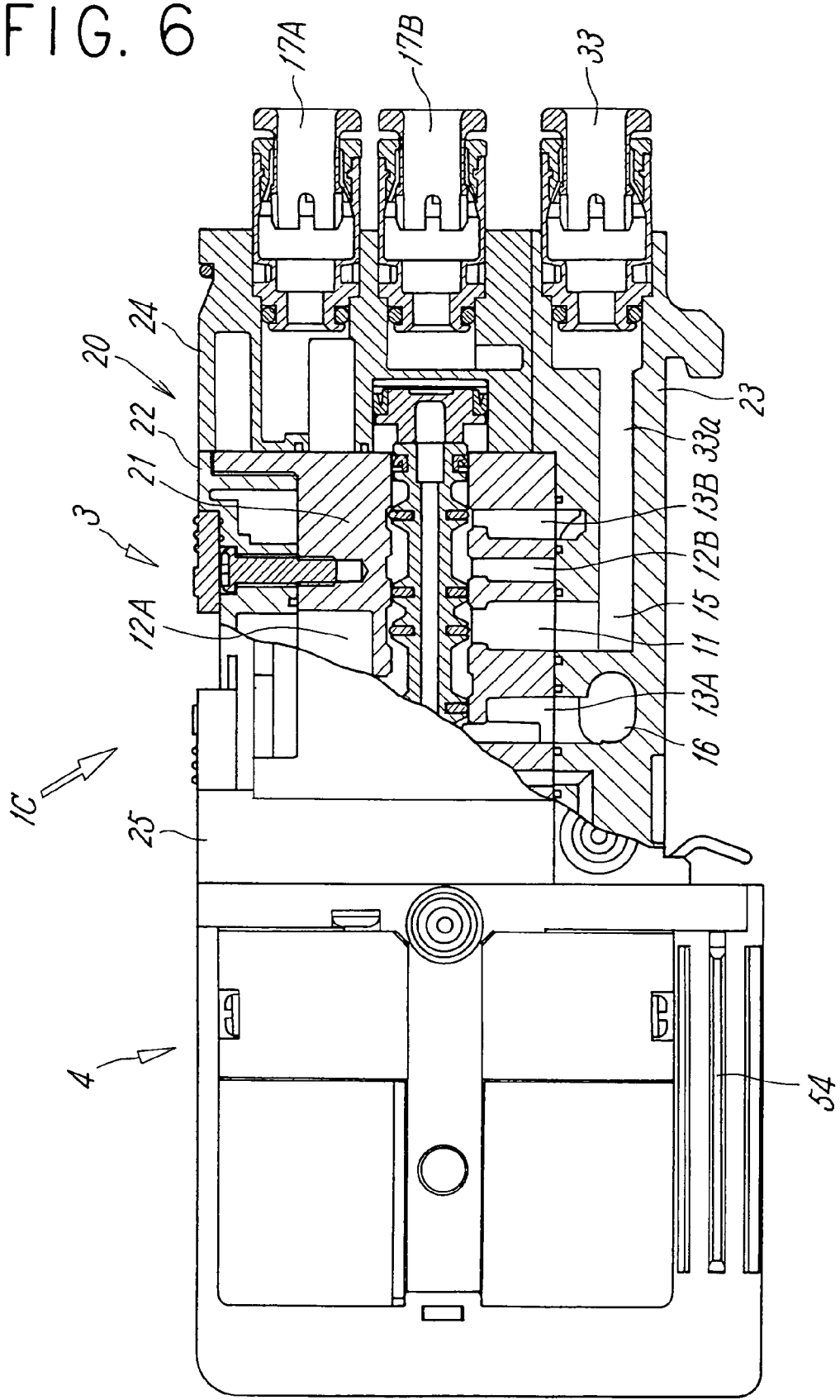
FIG. 6 is a cross-sectional view of the solenoid valve according to a third embodiment of the present invention.

FIG. 6 shows a third embodiment of the manifold-type solenoid valve with an external port according to the present invention. In a solenoid valve 1C in the third embodiment, the bottom block 23 is formed to have a length as the center block 21 and the port block 24 in the connected state, and the external port 33 is formed on the end surface of the bottom block 23 so as to communicate with the connecting flow path 15 via a communication hole 33a. Therefore, the port block 24 is provided with two output ports 17A, 17B.

Since structures of the solenoid valve 1C according to the third embodiment other than those shown above, and the operation are substantially the same as the solenoid valve 1A according to the first embodiment, the principal identical components are represented by the same reference numerals as in the first embodiment, and description thereof is omitted.

The solenoid valves 1A, 1B, 1C in the first to third embodiments are all configured in such a manner that the connecting flow path for supply is the connecting flow path of both-way connecting type which includes the connecting ports 26, 27 opening on both side surfaces of the bottom block 23 and one or both of these two connecting ports 26, 27 are blockaded as needed by the lid member(s) 35 when in use. As an alternative modification, a structure in which one or both of the two connecting ports 26, 27 is (are) blockaded with (a) shielding wall(s) formed inside of the hole integrally therewith into a no-hole state in advance, that is, from the stage of manufacturing the bottom block 23 may be employed. In this case, the connecting flow path 15, which is blockaded in advance at one of the connecting port 26 or 27, is the connecting flow path for one-way connection having only the other connecting port opened. However, the opened connecting port can be blockaded by the lid member 35 as needed.

In the modification in which the both of the connecting ports 26, 27 of the connecting flow path 15 are blockaded in advance, the connecting flow path 15 no longer has a function as the flow path, but only has the same appearance as the connecting flow path 16 for discharge. Therefore, in an actual state, only the connecting flow path 16 for discharge alone is formed on the bottom block 23, and the external port 33 is directly in communication with the switching flow path 11 for supply without intermediary of the connecting flow path 15.

In the case in which one or both of the connecting ports of the connecting flow path 15 for supply are closed in advance as in the case of this modification as well, it is preferable to form the connecting tube portion 26 and the tube receiving portion 27 at both ends of the connecting flow path 15 in order to connect the adjacent solenoid valves reliably and stably with respect to each other.

According to the respective solenoid valves in the first to third embodiments and the modification thereof, any one of the flow path diagrams in FIG. 12 to FIG. 14 can be realized using the same instead of the solenoid valve 1A with an external port in the solenoid valve assembly shown in FIG. 11, as a matter of course.

Figure 7:
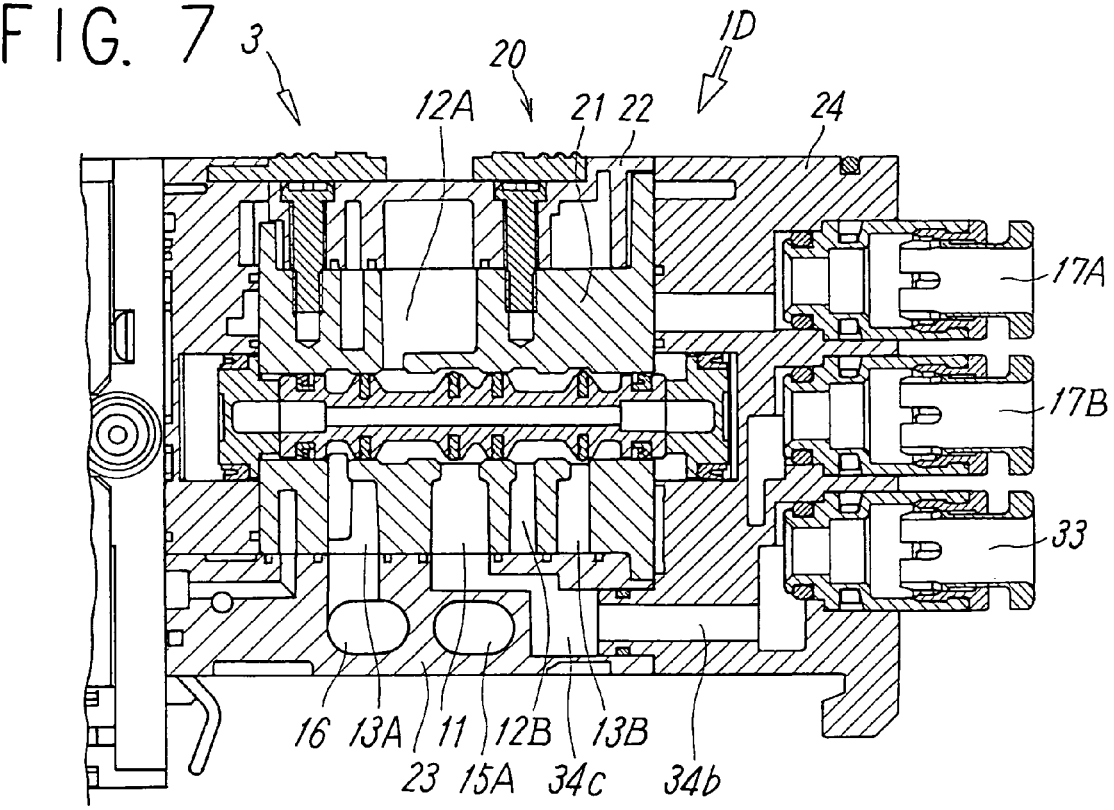
FIG. 7 is a cross-sectional view of the solenoid valve according to a fourth embodiment of the present invention.

FIG. 7 is a cross-sectional view of a principal portion of a fourth embodiment of the manifold-type solenoid valve with an external port according to the present invention. A different point of a solenoid valve 1D in the fourth embodiment from the solenoid valve 1A of the first embodiment is that the external port 33 is in communication with the switching flow path 11 for supply via the connecting flow path 15 for supply in the case of the solenoid valve 1A in the first embodiment, while the external port 33 is directly communicate with the switching flow path 11 for supply from the communication hole 34b through a communication hole 34c in the bottom block 23, and a direct flow path 15A for supply is formed instead of the connecting flow path 15 for supply in the case of the solenoid valve 1D, and the direct flow path 15A is blocked both from the switching flow path 11 for supply and the external port 33. The direct flow path 15A is the both-way connecting type having the connecting ports on both left and right side surfaces of the housing 20 as in the case of the connecting flow path 16 for discharge, and has the connecting tube portion and the tube receiving portion on both ends.

Since structures other than those described above are substantially the same as the solenoid valve 1A in the first embodiment, the identical principal components are represented by the same reference numerals as in the first embodiment and description thereof is omitted.

Figure 15:
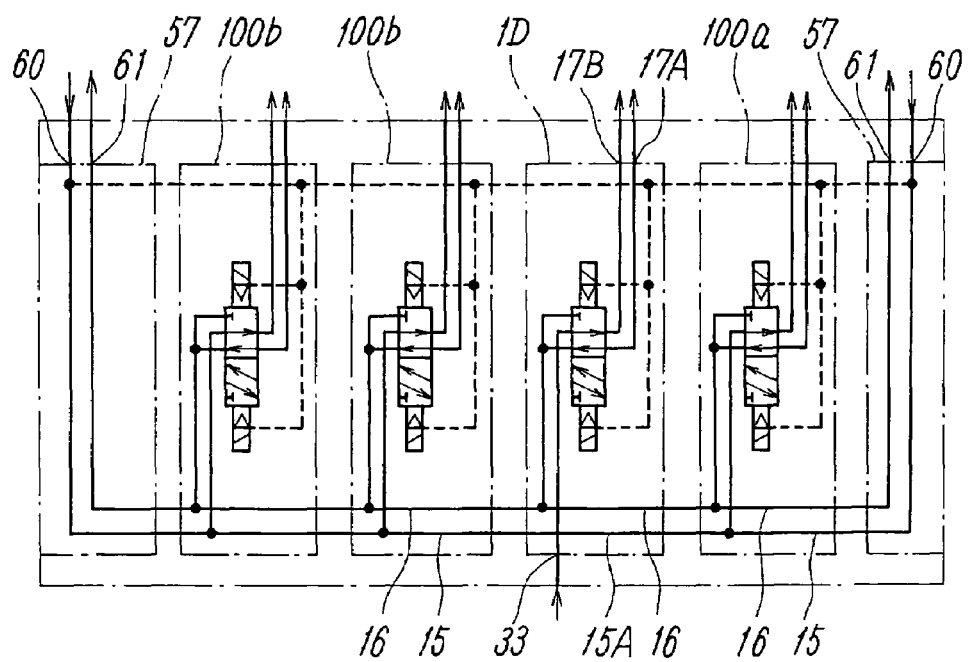
FIG. 15 is a flow path diagram showing another example of the connecting state of the flow path which can be realized by the solenoid valve assembly.

The flow path diagram in FIG. 15 is a flow path diagram showing a case in which the solenoid valve 1D in the fourth embodiment is used instead of the solenoid valve 1A with an external port in the solenoid valve assembly in FIG. 11. In this flow path diagram, all the connecting flow paths 15 for supply of the respective standard solenoid valves 100a, 100b are in communication with each other via the direct flow path 15A in the solenoid valve 1D with an external port, and are connected respectively to the supply ports 60 of the two supply and discharge blocks 57 built in the row of the solenoid valves on both sides. Therefore, air is supplied to the standard solenoid valves 100a, 100b from one or both of the supply and discharge blocks 57, and air is supplied to the solenoid valve 1D with an external port from the external port 33 independently.

All the connecting flow paths 16 for discharge of the respective solenoid valves 1D, 100a, 100b are in communication with the discharge port 61 of the supply and discharge block 57, and air in all the solenoid valves are collectively discharged through the supply and discharge block 57.

In this flow path diagram, the supply and discharge block 57 may be any one of those.

The solenoid valves 1A, 1B, 1C, 1D in the first to fourth embodiments are all provided with a function of independent supply to the external port 33 by configuring the bottom block 23 to have an internal structure for independent supply. However, by configuring the bottom block to have an internal structure for independent discharge, the function of independent discharge can be provided to the external port 33.

Figure 8:
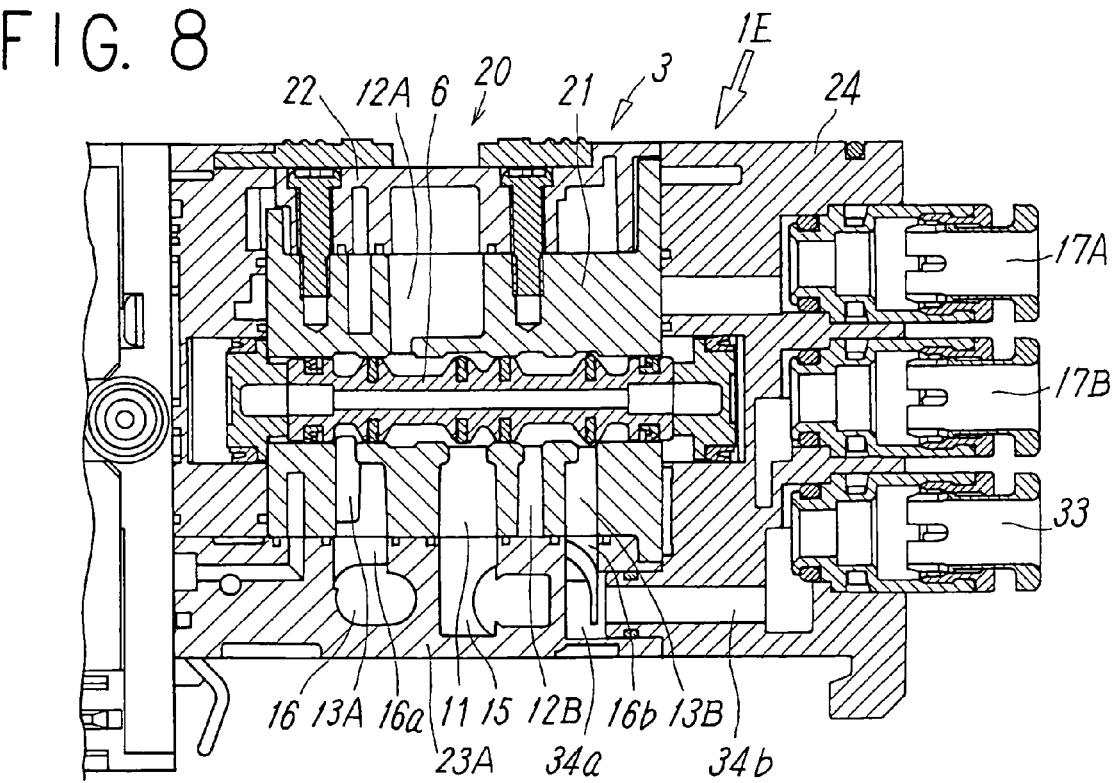
FIG. 8 is a cross-sectional view of a principal portion of the solenoid valve according to a fifth embodiment of the present invention.
Figure 9:
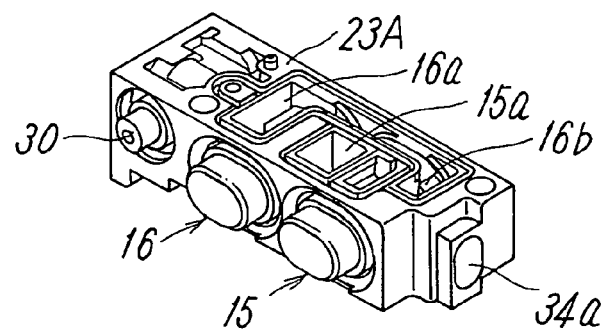
FIG. 9 is a perspective view of a bottom block according to the fifth embodiment.

FIG. 8 and FIG. 9 show cross-sectional views of a solenoid valve 1E according to a fifth embodiment in which a bottom block 23A having the internal structure for independent discharge is mounted, and a perspective view of the bottom block 23A. The bottom block 23A is configured in such a manner that the connecting flow path 16 for discharge out of the two connecting flow paths 15, 16 for supply and discharge is in communication with the switching flow paths 13A, 13B for discharge via the branch holes 16a, 16b, and is also in communication with the external port 33 from the one of the branch hole 16b through the communication holes 34a, 34b, whereby the connecting flow path 15 for supply is brought into communication only with the switching flow path 11 for supply. Since other structures or preferred modifications are substantially the same as the case of the solenoid valve 1A in the first embodiment, the principal identical components are represented by the same reference numerals as the solenoid valve 1A in the first embodiment, and description thereof is omitted.

By configuring the bottom block 23A as described above, the exhaust fluid from the switching flow paths 13A, 13B for discharge can be discharged independently from the external port 33. On the other hand, air supply to the solenoid valve 1E is performed from the connecting flow path 15 for collective supply through the switching flow path 11.

Figure 1:
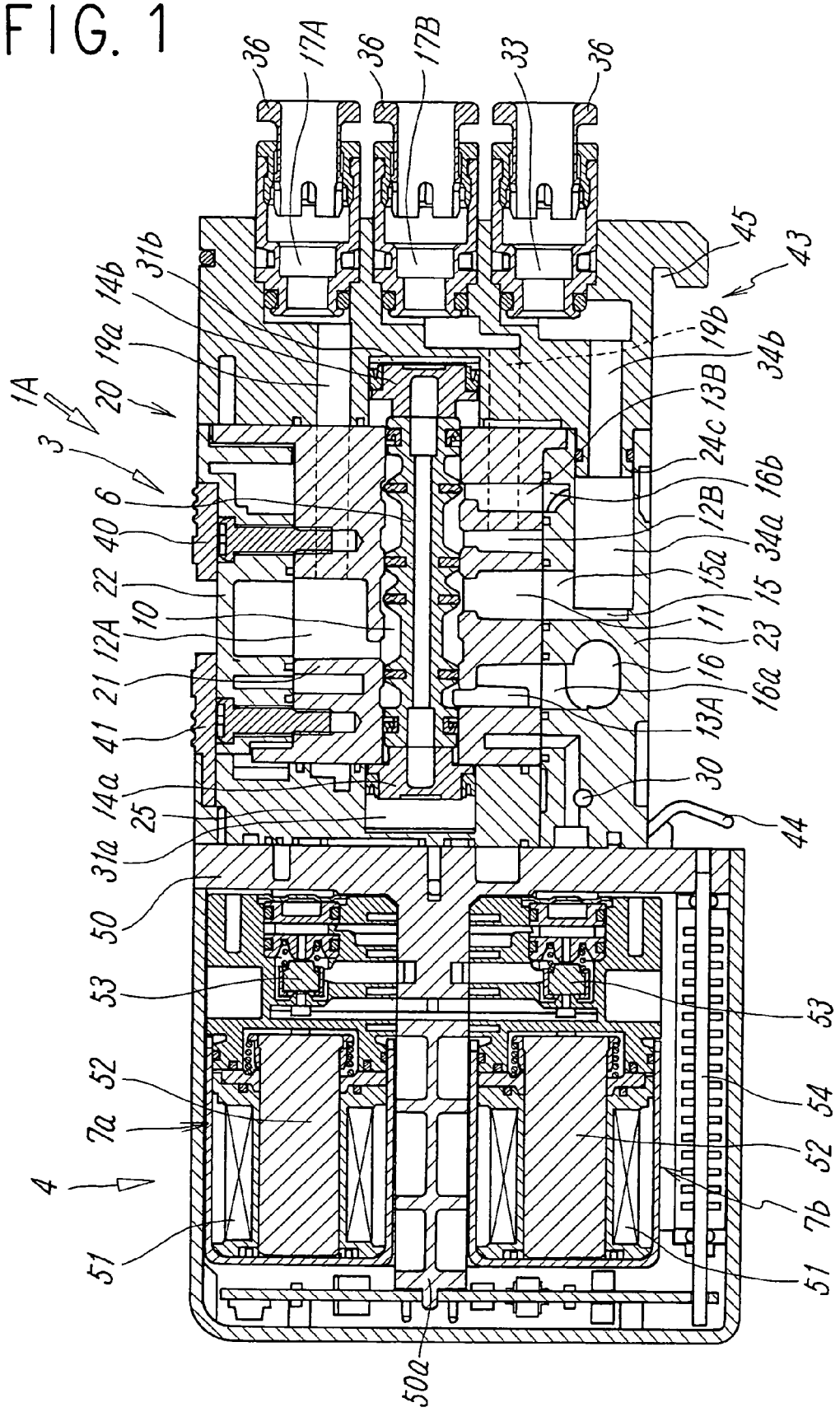
FIG. 1 is a cross-sectional view showing a first embodiment of a solenoid valve according to the present invention.
Figure 2:
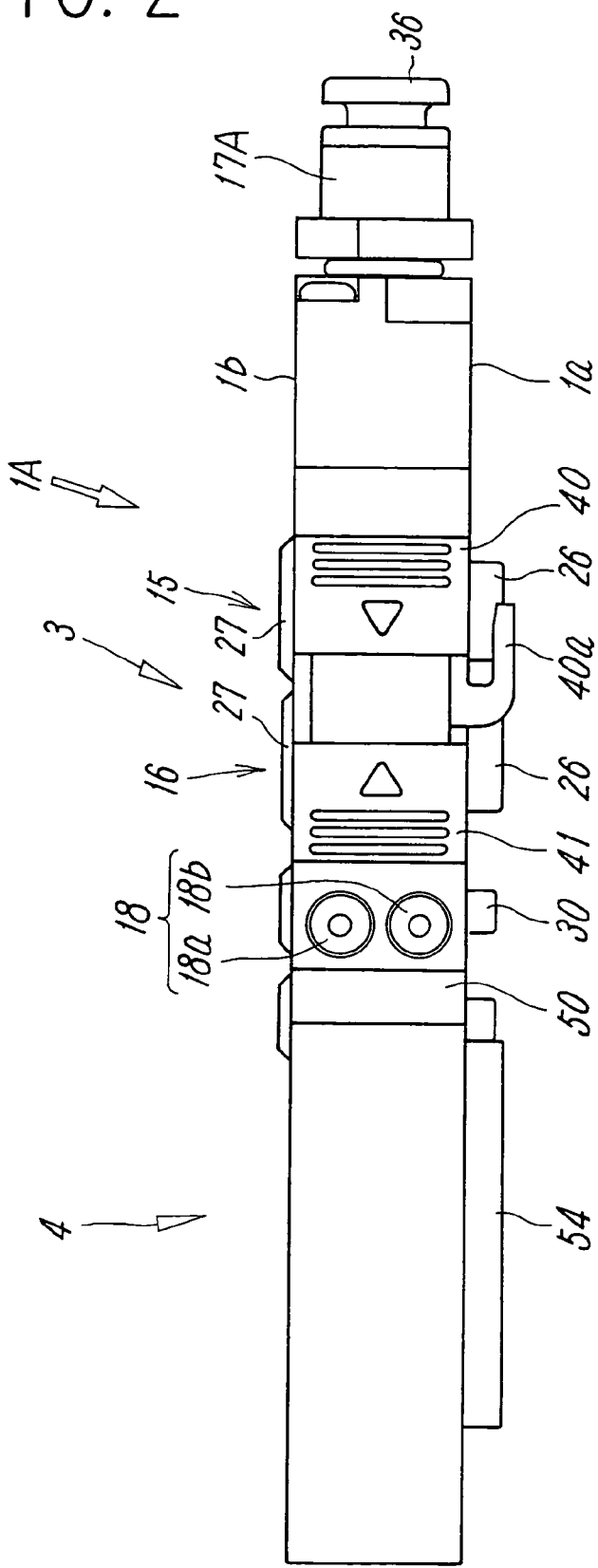
FIG. 2 is a plan view of the solenoid valve shown in FIG. 1.
Figure 3:
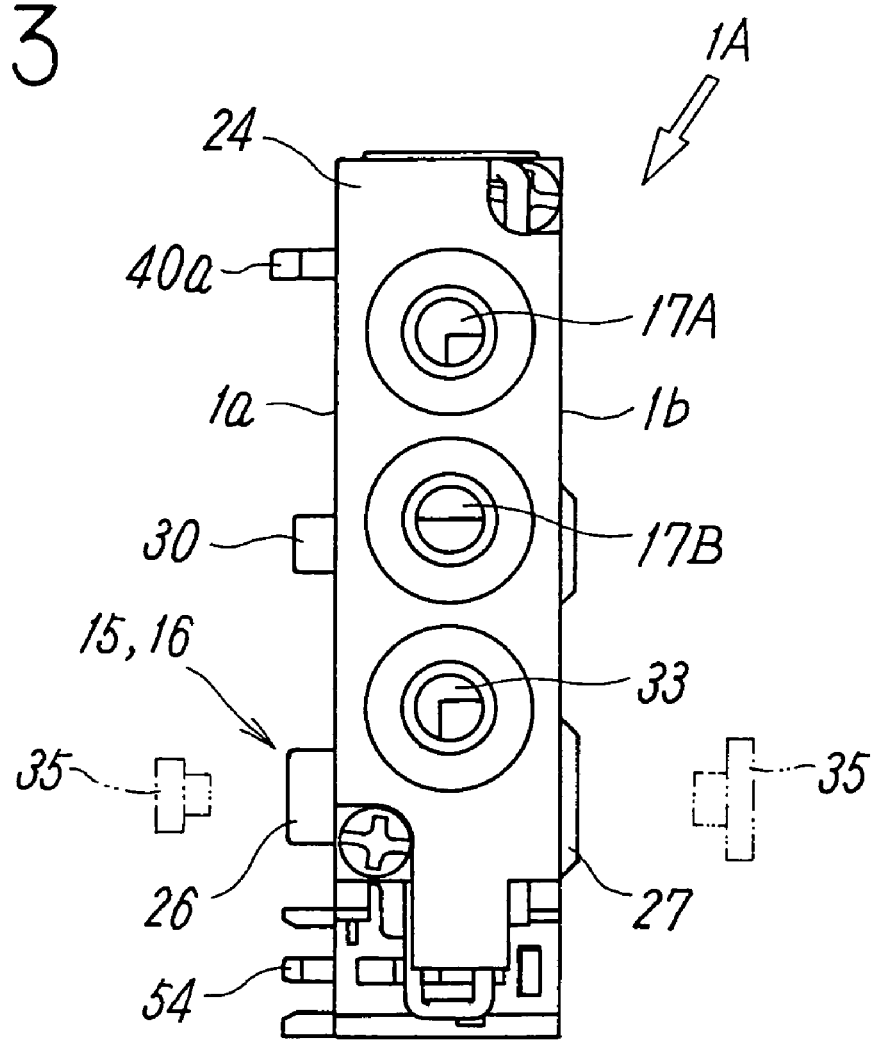
FIG. 3 is a right side view of the solenoid valve in FIG. 1.
Figure 4:
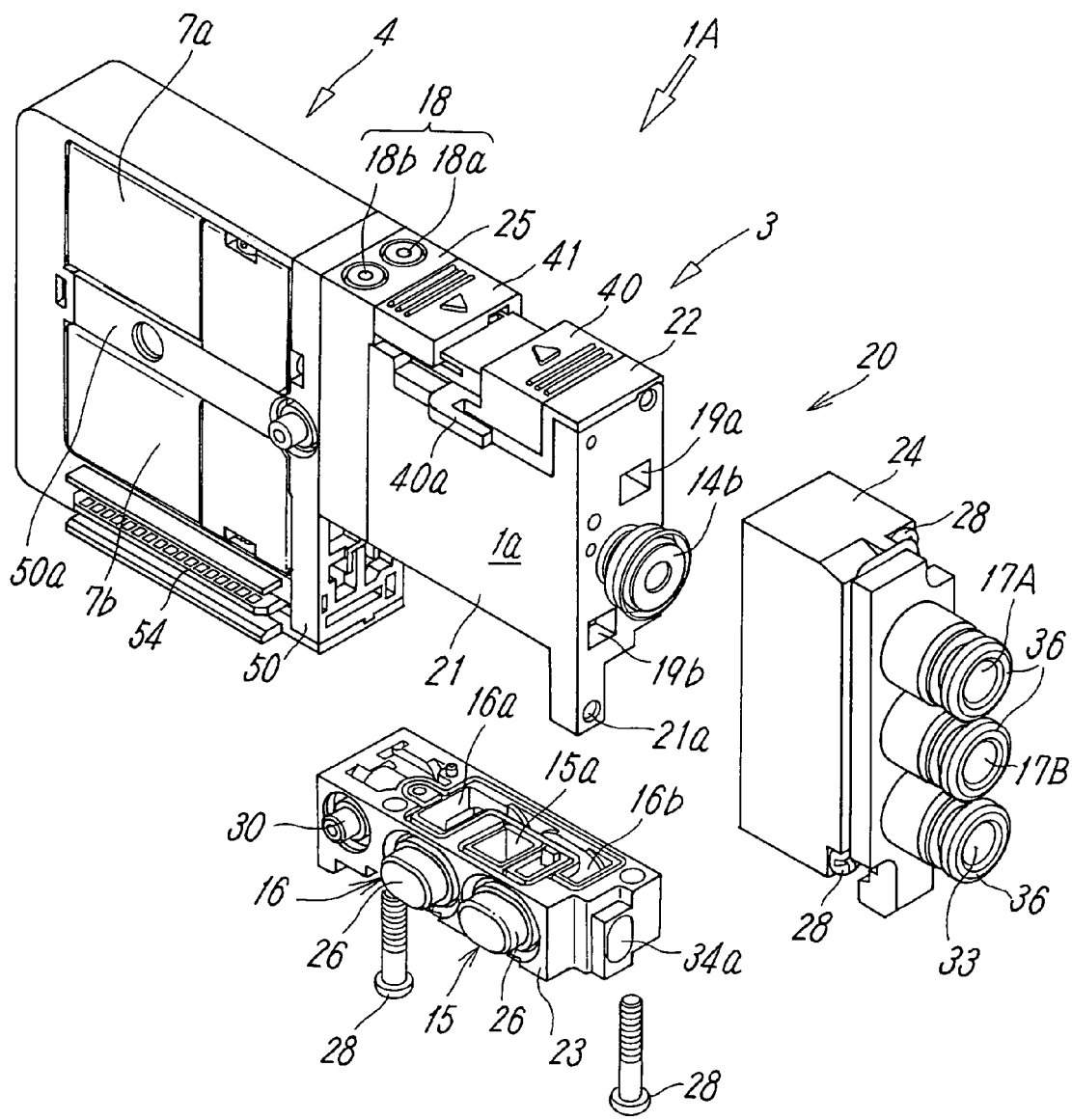
FIG. 4 is a perspective view showing the solenoid valve in FIG. 1 in partly disassembled state.

In this case, it is preferable to form the bottom block 23A for independent discharge to have the same outer shape or dimensions as the bottom block 23 for independent supply in the solenoid valve 1A in the first embodiment shown in FIG. 1 and FIG. 4, so that they can exchange with each other. Accordingly, the function of the external port 33 can be converted easily between the independent supply and independent discharge only by exchanging the bottom blocks 23 and 23A with respect to each other without changing other components, whereby common use of the components is achieved. Although this is the same for the solenoid valves 1B, 1C in the second and third embodiments shown in FIG. 5 and FIG. 6, as in the case of solenoid valve 1C in the third embodiment in which the external port 33 is provided on the bottom block 23 and the case of other solenoid valve in which the external port 33 is provided on the port block 24, both of the bottom block 23 and the port block 24 can be replaced.

Figure 10:
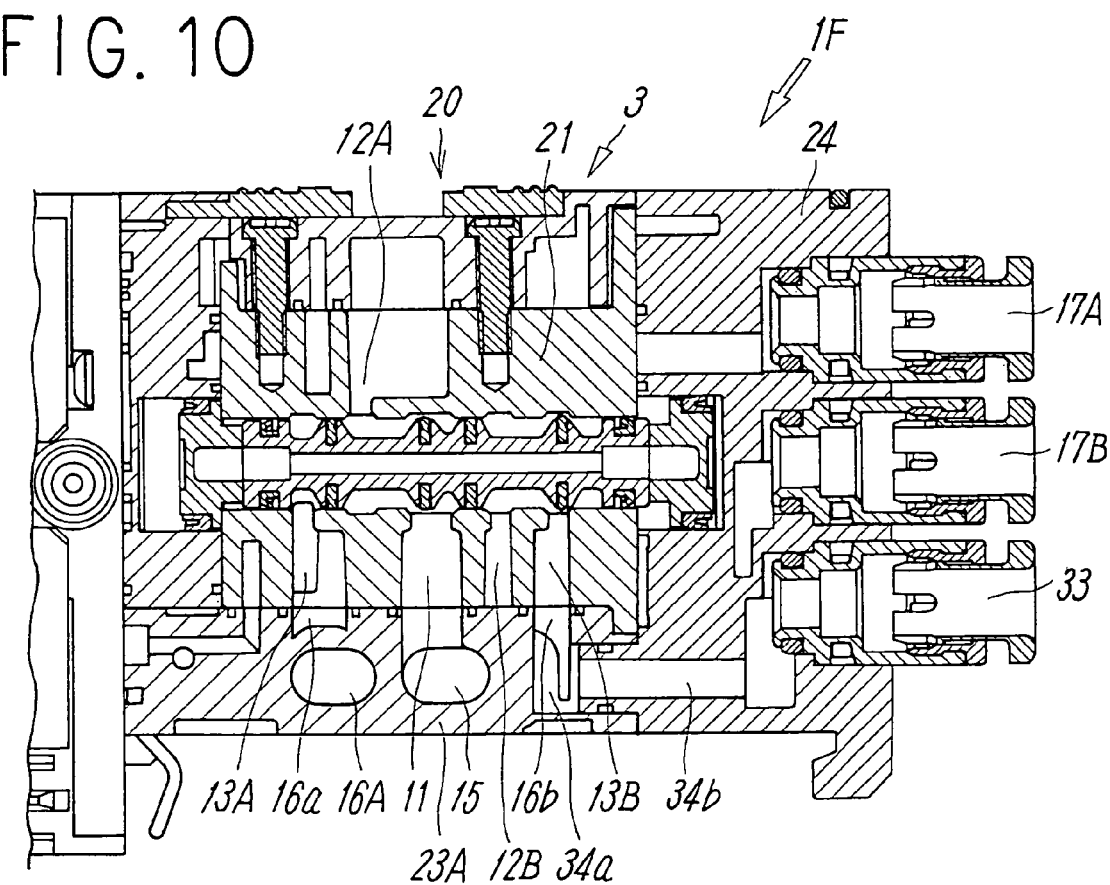
FIG. 10 is a cross-sectional view of a principal portion of the solenoid valve according to a sixth embodiment of the present invention.

FIG. 10 is a cross-sectional view of a principal portion of the solenoid valve according to a sixth embodiment. In a solenoid valve 1F, the bottom block 23A for independent discharge includes the connecting flow path 15 for collective supply in communication with the switching flow path 11 for supply, and a direct flow path 16A for collective discharge blocked both from the switching flow paths 13A, 13B for discharge and the external port 33, and the external port 33 is directly in communication with the switching flow paths 13A, 13B for discharge through the communication holes 34a, 34b and the branch holes 16a, 16b within the bottom block 23A. The connecting flow path 15 and the direct flow path 16A are of both-way connecting type having the connecting ports on both left and right side surfaces of the bottom block 23A.

Figure 16:
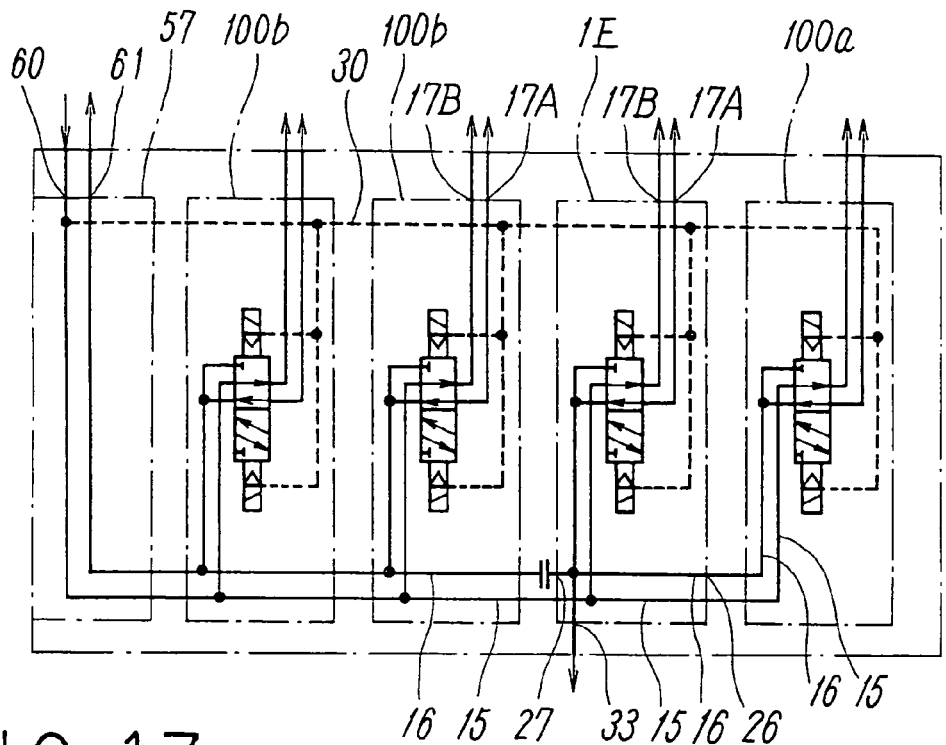
FIG. 16 is a flow path diagram showing another example of the connecting state of the flow path which can be realized by the solenoid valve assembly.
Figure 17:
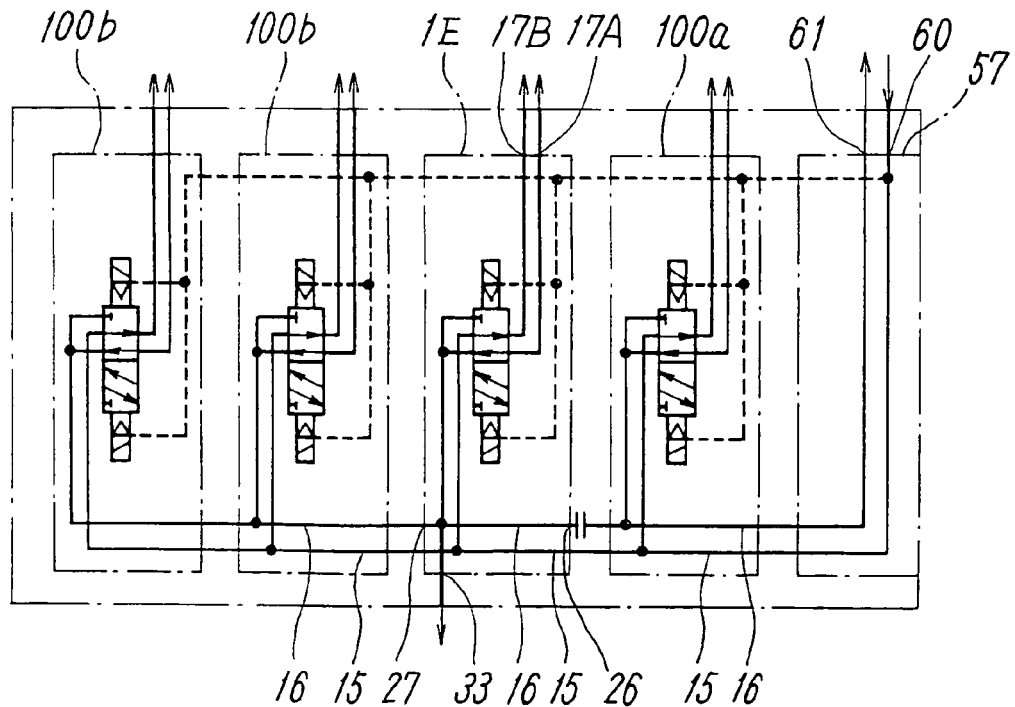
FIG. 17 is a flow path diagram showing another example of the connecting state of the flow path which can be realized by the solenoid valve assembly.
Figure 18:
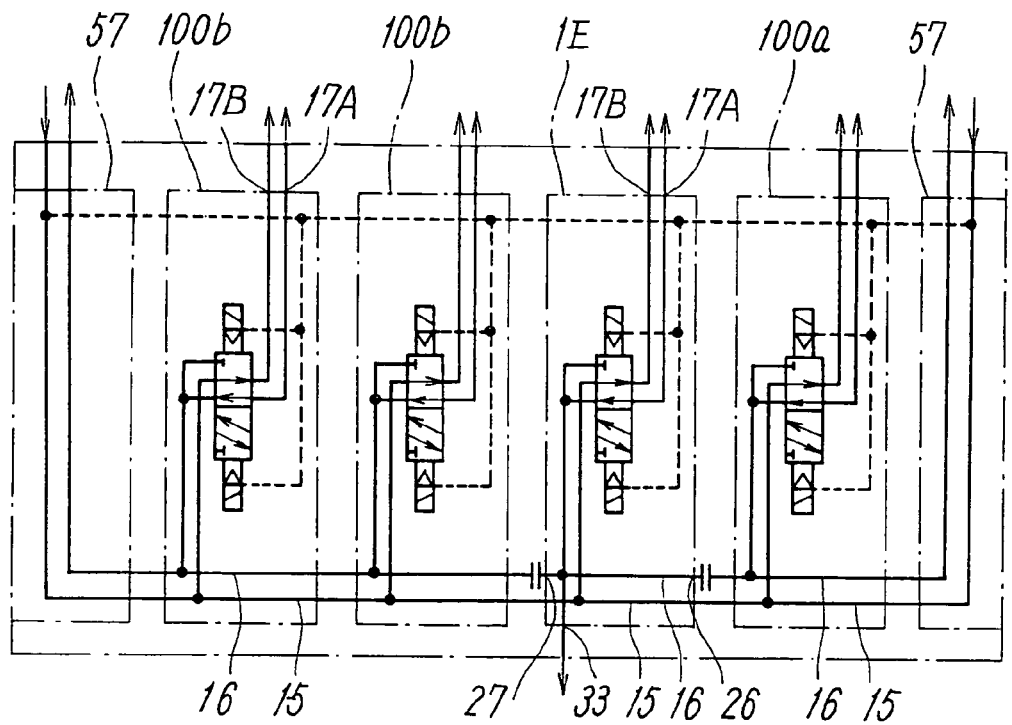
FIG. 18 is a flow path diagram showing another example of the connecting state of the flow path which can be realized by the solenoid valve assembly.

FIG. 16 to FIG. 18 show examples of the flow path diagrams which can be realized in a case in which the solenoid valve 1E of the fifth embodiment provided with the external port 33 for independent discharge is built in instead of the solenoid valve 1A in the solenoid valve assembly in FIG. 11 in reference numerals. The flow path diagrams correspond to the flow path diagrams in FIG. 12 to FIG. 14 individually, and the connecting state of the connecting flow path 15 for supply and the connecting state of the connecting flow path 16 for discharge are exchanged with respect to each other. In other words, the flow path diagrams in FIG. 12 to FIG. 14 show cases in which discharge of air from the respective solenoid valves 1A, 100a, 100b is performed collectively from the supply and discharge block 57 via the connecting flow path 16 for discharge, and air is supplied collectively through the connecting flow path 15 for supply from the supply and discharge block 57 and supplied independently from the solenoid valve 1A with an external port, while the flow path diagrams in FIG. 16 to FIG. 18 show cases in which air supply to the respective solenoid valves 1E, 100a, 100b are performed collectively from the supply and discharge block 57 through the connecting flow path 15 for supply, and air is discharged collectively from the supply and discharge block 57 through the connecting flow path 16 for discharge, and independently from the solenoid valve 1A with an external port. Therefore, further detailed description about the structure of the flow path will be omitted in order to avoid redundancy.

Figure 19:
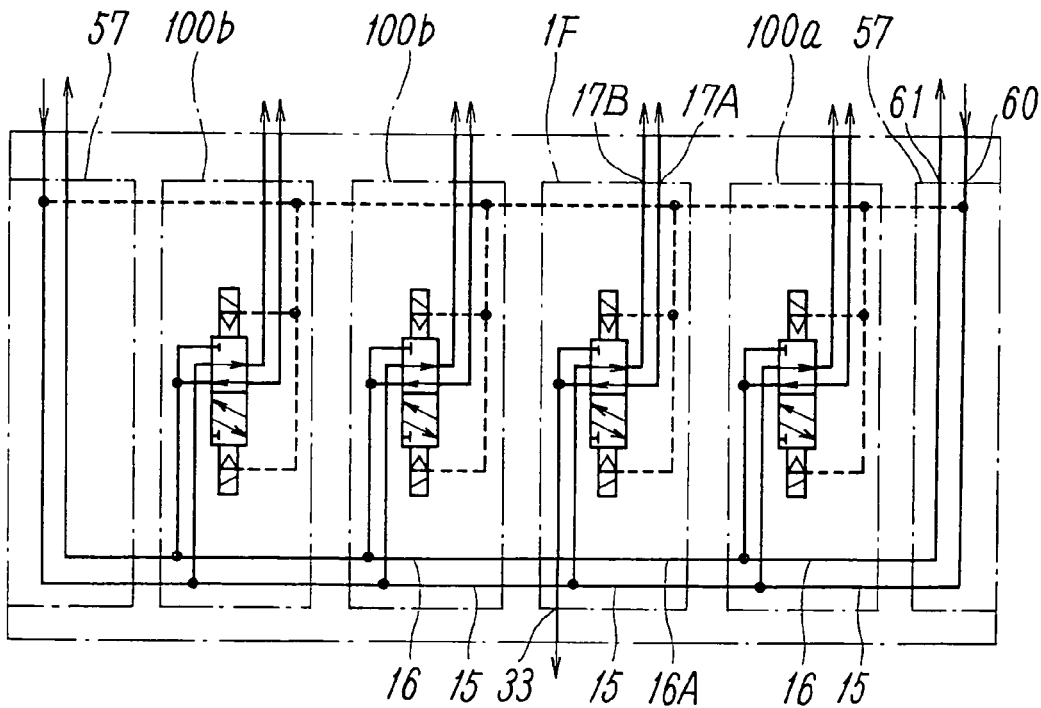
FIG. 19 is a flow path diagram showing another example of the connecting state of the flow path which can be realized by the solenoid valve assembly.

FIG. 19 shows an example of the flow path diagram in the solenoid valve assembly in which the solenoid valve 1F shown in the sixth embodiment in reference numerals. The flow path diagram corresponds to the flow path diagram in FIG. 15, and the connecting state of the connecting flow path 15 for supply and the connecting state of the connecting flow path 16 for discharge are exchanged with respect to each other. Therefore, relating this flow path diagram, detailed description of the structure of the flow path will be omitted in order to avoid redundancy.

While the double-pilot type solenoid valve provided with two pilot valves 7a, 7b are shown as the solenoid valve in the respective embodiments described above, the present invention can be applied to a solenoid valve of single pilot type having only one pilot valve.

The solenoid valve to which the present invention can be applied is not limited to the five-port type and, may be other one, for example, the three-port type. In the case of the three-port type, one each of the switching flow path is provided for output and discharge, and there is only one output port.

In addition, the solenoid valve assembly shown in FIG. 11 is an example which can be configured with the solenoid valve with an external port, and the number and the arrangement of the solenoid valves with an external port or the standard solenoid valves may be changed in various manners as needed.

The invention claimed is:

1. A manifold-type solenoid valve, comprising:
a main valve section having a spool in a valve hole to which respective switching flow paths for supply, output, and discharge are opened; and
a solenoid operating section for driving the spool with an electromagnetic force, the main valve section comprising connecting flow paths for collective supply and/or collective discharge having connecting ports opened on a side surface of a housing, output ports on the housing at a first end surface of one end side in an axial direction of the valve hole, and an external port for connecting an external piping for independent supply or independent discharge at the first end surface of the one end side in the axial direction of the valve hole, in the housing,
wherein the output ports are in communication with the valve hole via the switching flow path for output, the connecting flow paths for collective supply and/or collective discharge are connectable with connecting flow paths corresponding to neighboring solenoid valves in a solenoid valve assembly via the connecting ports and are in communication with the valve hole via the switching flow path for supply and the switching flow path for discharge, and the external port is arranged on the first end surface adjacent to the output ports and is directly in communication with the switching flow path for supply or the switching flow path for discharge.

2. The solenoid valve according to claim 1, wherein the housing comprises one connecting flow path of both-way connecting type having the connecting ports opening on both left and right side surfaces of the housing, the connecting flow path is in communication with any one of the switching flow paths for supply or discharge, and the external port is directly in communication with the other switching flow path without intermediary of the connecting flow path.

3. The solenoid valve according to claim 2, wherein the housing further comprises a direct flow path of both-way connecting type having the connecting ports opening on both left and right side surfaces of the housing, and the direct flow path is blocked both from the switching flow path and from the external port.

4. The solenoid valve according to claim 1, wherein the housing comprises one each of the connecting flow path of both-way connecting type having the connecting ports opening on both left and right side surfaces of the housing, and the connecting flow path of one-way connecting type having an connecting port opening on one side surface, and the connecting flow paths are in communication with one of the switching flow paths for supply and for discharge, respectively, and the external port is in communication with the connecting flow path of one-way connecting type, and the connecting port of the connecting flow path of one-way connecting type can be blockaded by a lid member.

5. The solenoid valve according to claim 1, wherein the housing includes two connecting flow paths of both-way connecting type having the connecting ports opening on both left and right side surfaces of the housing, and the connecting flow paths are in communication with the switching flow path for supply or for the switching flow path for discharge, the external port is in communication with one of the connecting flow paths, and at least one of the connecting ports of the connecting flow path in communication with the external port, which are opened on both side surfaces of the housing, can be blockaded by a lid member.

6. The solenoid valve according to claim 1, wherein the housing of the main valve section is constructed by a plurality of blocks, and one of the blocks is a bottom block of a lower end of the housing and is provided with the connecting flow path, and the external port is in communication with the switching flow path via the bottom block, so that a function of the external port can be changed to a supplying function or a discharging function by replacing the bottom block by a bottom block which has a different connection among the connecting flow path, the external port, and the switching flow path.

7. The solenoid valve according to claim 2, wherein the housing of the main valve section is constructed by a plurality of blocks, and a bottom block as one of these blocks is provided with the connecting flow path, and the external port is in communication with the switching flow path via the bottom block, so that the function of the external port can be changed to supplying function or discharging function by replacing the bottom block by a bottom block which has different connection among the connecting flow path, the external port, and the switching flow path.

8. The solenoid valve according to claim 3, wherein the housing of the main valve section is constructed by a plurality of blocks, and a bottom block as one of these blocks is provided with the connecting flow path, and the external port is in communication with the switching flow path via the bottom block, so that the function of the external port can be changed to supplying function or discharging function by replacing the bottom block by a bottom block which has different connection among the connecting flow path, the external port, and the switching flow path.

9. The solenoid valve according to claim 4, wherein the housing of the main valve section is constructed by a plurality of blocks, and a bottom block as one of these blocks is provided with the connecting flow path, and the external port is in communication with the switching flow path via the bottom block so that the function of the external port can be changed to supplying function or discharging function by replacing the bottom block by a bottom block which has different connection among the connecting flow path, the external port, and the switching flow path.

10. The solenoid valve according to claim 5, wherein the housing of the main valve section is constructed by a plurality of blocks, and one of the blocks is a bottom block of a lower end of the housing and is provided with the connecting flow path, and the external port is in communication with the switching flow path via the bottom block, so that a function of the external port can be changed to a supplying function or a discharging function by replacing the bottom block by a bottom block which has a different connection among the connecting flow path, the external port, and the switching flow path.

11. The solenoid valve according to claim 6,
wherein the bottom block comprises a bottom block for independent supply or a bottom block for independent discharge which are exchangeable with respect to each other,
wherein the bottom block for independent supply comprises a connecting flow path for discharge being in communication with the switching flow path for discharge but blocked from the external port, and is constituted to bring the external port to be in direct communication with the switching flow path for supply or in communication therewith via the connecting flow for supply, and
wherein the bottom block for independent discharge comprises a connecting flow path for supply being in communication with the switching flow path for supply but blocked from the external port, and is constituted to bring the external port to be in direct communication with the switching flow path for discharge or to be in communication therewith via the connecting flow path for discharge.

12. The solenoid valve according to claim 7,
wherein the bottom block comprises a bottom block for independent supply or a bottom block for independent discharge which are exchangeable with respect to each other,
wherein the bottom block for independent supply comprises a connecting flow path for discharge being in communication with the switching flow path for discharge but blocked from the external port, and is constituted to bring the external port to be in direct communication with the switching flow path for supply or in communication therewith via the connecting flow path for supply, and
wherein the bottom block for independent discharge comprises a connecting flow path for supply being in communication with the switching flow path for supply but blocked from the external port, and is constituted to bring the external port to be in direct communication with the switching flow path for discharge or to be in communication therewith via the connecting flow path for discharge.

13. The solenoid valve according to claim 8,
wherein the bottom block comprises a bottom block for independent supply or a bottom block for independent discharge which are exchangeable with respect to each other,
wherein the bottom block for independent supply comprises a connecting flow path for discharge being in communication with the switching flow path for discharge but blocked from the external port, and is constituted to bring the external port to be in direct communication with the switching flow path for supply or in communication therewith via the connecting flow path for supply, and
wherein the bottom block for independent discharge comprises a connecting flow path for supply being in communication with the switching flow path for supply but blocked from the external port, and is constituted to bring the external port to be in direct communication with the switching flow path for discharge or to be in communication therewith via the connecting flow path for discharge.

14. The solenoid valve according to claim 9,
wherein the bottom block comprises a bottom block for independent supply or a bottom block for independent discharge which are exchangeable with respect to each other,
wherein the bottom block for independent supply comprises a connecting flow path for discharge being in communication with the switching flow path for discharge but blocked from the external port, and is constituted to bring the external port to be in direct communication with the switching flow path for supply or in communication therewith via the connecting flow path for supply, and
wherein the bottom block for independent discharge comprises a connecting flow path for supply being in communication with the switching flow path for supply but blocked from the external port, and is constituted to bring the external port to be in direct communication with the switching flow path for discharge or to be in communication therewith via the connecting flow path for discharge.

15. The solenoid valve according to claim 10,
wherein the bottom block comprises a bottom block for independent supply or a bottom block for independent discharge which are exchangeable with respect to each other,
wherein the bottom block for independent supply comprises a connecting flow path for discharge being in communication with the switching flow path for discharge but blocked from the external port, and is constituted to bring the external port to be in direct communication with the switching flow path for supply or in communication therewith via the connecting flow path for supply, and wherein the bottom block for independent discharge comprises a connecting flow path for supply being in communication with the switching flow path for supply but blocked from the external port, and is constituted to bring the external port to be in direct communication with the switching flow path for discharge or to be in communication therewith via the connecting flow path for discharge.

16. The solenoid valve according to claim 6, wherein an other one of the blocks constituting the housing is a port block provided on the one end side in the axial direction of the valve hole in the housing, and the output port and the external port are formed on the port block.

17. The solenoid valve according to claim 7, wherein the output port and the external port are formed on a port block which is an other one of the blocks constituting the housing.

18. The solenoid valve according to claim 8, wherein the output port and the external port are formed on a port block which is an other one of the blocks constituting the housing.

19. The solenoid valve according to claim 9, wherein the output port and the external port are formed on a port block which is an other one of the blocks constituting the housing.

20. The solenoid valve according to claim 10, wherein the output port and the external port are formed on a port block which is an other one of the blocks constituting the housing.

21. The solenoid valve according to claim 11, wherein the output port and the external port are formed on a port block which is an other one of the blocks constituting the housing.

22. The solenoid valve according to claim 12, wherein the output port and the external port are formed on a port block which is an other one of the blocks constituting the housing.

23. The solenoid valve according to claim 13, wherein the output port and the external port are formed on a port block which is an other one of the blocks constituting the housing.

24. The solenoid valve according to claim 14, wherein the output port and the external port are formed on a port block which is an other one of the blocks constituting the housing.

25. The solenoid valve according to claim 15, wherein the output port and the external port are formed on a port block which is an other one of the blocks constituting the housing.

26. The solenoid valve according to claim 6, wherein the output port is formed on a port block which is an other one of the blocks constituting the housing, and the external port is formed on the bottom block.

27. The solenoid valve according to claim 7, wherein the output port is formed on a port block which is an other one of the blocks constituting the housing, and the external port is formed on the bottom block.

28. The solenoid valve according to claim 8, wherein the output port is formed on a port block which is an other one of the blocks constituting the housing, and the external port is formed on the bottom block.

29. The solenoid valve according to claim 9, wherein the output port is formed on a port block which is an other one of the blocks constituting the housing, and the external port is formed on the bottom block.

30. The solenoid valve according to claim 10, wherein the output port is formed on a port block which is an other one of the blocks constituting the housing, and the external port is formed on the bottom block.

31. The solenoid valve according to claim 11, wherein the output port is formed on a port block which is an other one of the blocks constituting the housing, and the external port is formed on the bottom block.

32. The solenoid valve according to claim 12, wherein the output port is formed on a port block which is an other one of the blocks constituting the housing, and the external port is formed on the bottom block.

33. The solenoid valve according to claim 13, wherein the output port is formed on a port block which is an other one of the blocks constituting the housing, and the external port is formed on the bottom block.

34. The solenoid valve according to claim 14, wherein the output port is formed on a port block which is an other one of the blocks constituting the housing, and the external port is formed on the bottom block.

35. The solenoid valve according to claim 15, wherein the output port is formed on a port block which is an other one of the blocks constituting the housing, and the external port is formed on the bottom block.

36. The solenoid valve according to claim 1, wherein the housing of the main valve section includes a plurality of blocks, the plurality of blocks including a center block in a center of the housing, a bottom block connected to a lower part of the center block, and a port block connected to the center block and the bottom block at the one end side in the axial direction of the valve hole, and wherein the center block is provided with the valve hole, the bottom block is provided with the connecting flow path, and the port block is provided with the output port and the external port.

37. The solenoid valve according to claim 36, wherein the housing of the main valve section further comprises a top block connected to an upper end of the center block, and the top block is provided with a hook to engage other adjacent solenoid valves when a solenoid valve assembly is formed.

* * * * *